US011868242B1

(12) United States Patent
Merritt

(10) Patent No.: US 11,868,242 B1
(45) Date of Patent: ***Jan. 9, 2024

(54) METHOD, APPARATUS, AND COMPUTER PROGRAM PRODUCT FOR PREDICTIVE API TEST SUITE SELECTION

(71) Applicant: Liberty Mutual Insurance Company, Boston, MA (US)

(72) Inventor: Gordon Merritt, Boston, MA (US)

(73) Assignee: Liberty Mutual Insurance Company, Boston, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/827,381

(22) Filed: May 27, 2022

Related U.S. Application Data

(63) Continuation of application No. 17/207,036, filed on Mar. 19, 2021, now Pat. No. 11,347,631, which is a continuation of application No. 16/002,514, filed on Jun. 7, 2018, now Pat. No. 10,990,516.

(60) Provisional application No. 62/517,052, filed on Jun. 8, 2017.

(51) Int. Cl.
*G06F 11/00* (2006.01)
*G06F 11/36* (2006.01)
*G06F 11/263* (2006.01)
*G06N 20/00* (2019.01)
*H04L 67/02* (2022.01)

(52) U.S. Cl.
CPC ........ *G06F 11/3692* (2013.01); *G06F 11/263* (2013.01); *G06F 11/3684* (2013.01); *G06F 11/3688* (2013.01); *G06N 20/00* (2019.01); *G06F 11/3664* (2013.01); *H04L 67/02* (2013.01)

(58) Field of Classification Search
CPC ............... G06F 11/3692; G06F 11/263; G06F 11/3684; G06F 11/3688; G06F 11/3664
USPC ....................................................... 714/1–57
See application file for complete search history.

(56) References Cited

U.S. PATENT DOCUMENTS

| 7,272,822 B1* | 9/2007 | Riggins | G06F 11/3688 717/124 |
| 7,945,902 B1* | 5/2011 | Sahoo | G06F 9/44589 714/48 |
| 8,887,135 B2 | 11/2014 | Banerjee et al. | |
| 8,924,938 B2 | 12/2014 | Chang et al. | |
| 9,471,471 B2 | 10/2016 | Champlin-Scharff et al. | |
| 9,582,408 B1 | 2/2017 | Jayaraman et al. | |

(Continued)

OTHER PUBLICATIONS

"API Functional Testing with SoapUI Pro," SmartBear Software, 5 pages, (2018). [Retrieved from the Internet Jun. 13, 2018: <URL: https://smartbear.com/product/ready-api/soapui/overview/>]. [Author Unknown].

*Primary Examiner* — Sarai E Butler
(74) *Attorney, Agent, or Firm* — Alston & Bird LLP

(57) ABSTRACT

Embodiments of the present disclosure provide methods, systems, apparatuses, and computer program products for selecting a test suite for an API. In one embodiment, a computing entity or apparatus is configured to receive test patterns and heuristics, receive an input API, the input API comprising API specifications, parse the input API to extract the API specifications, and based at least in part on the extracted API specifications and the test patterns and heuristics, select a test suite, wherein the test suite is programmatically generated using a machine learning model and comprises one or more test routines, one or more data values, and one or more expected results.

18 Claims, 6 Drawing Sheets

(56) References Cited

U.S. PATENT DOCUMENTS

| | | | |
|---|---|---|---|
| 10,117,083 B1 | 10/2018 | Sabatino et al. | |
| 10,990,516 B1 | 4/2021 | Merritt | |
| 11,347,631 B1 | 5/2022 | Merritt | |
| 2002/0116507 A1* | 8/2002 | Manjure | H04L 43/50 709/229 |
| 2005/0188262 A1* | 8/2005 | Rosenman | G06F 11/2294 714/25 |
| 2005/0193266 A1* | 9/2005 | Subramanian | G06F 11/3692 714/6.1 |
| 2005/0283667 A1* | 12/2005 | Batten | G06F 11/3672 714/25 |
| 2006/0190771 A1* | 8/2006 | Hefner | G06F 11/3684 714/38.14 |
| 2007/0240127 A1* | 10/2007 | Roques | G06F 8/315 717/124 |
| 2008/0040732 A1* | 2/2008 | Akiyama | G06F 8/30 719/328 |
| 2008/0072100 A1* | 3/2008 | Okada | G06F 11/3414 714/E11.193 |
| 2008/0120602 A1 | 5/2008 | Comstock et al. | |
| 2008/0162678 A1* | 7/2008 | Wang | H04L 41/5074 709/223 |
| 2008/0222455 A1* | 9/2008 | Caldwell | G06F 11/366 714/38.1 |
| 2009/0064110 A1 | 3/2009 | Sankaranarayanan et al. | |
| 2009/0276667 A1 | 11/2009 | Dopson et al. | |
| 2015/0082277 A1* | 3/2015 | Champlin-Scharff | G06F 11/3664 717/120 |
| 2015/0227452 A1 | 8/2015 | Raghavan et al. | |
| 2017/0024311 A1 | 1/2017 | Andrejko et al. | |
| 2017/0039133 A1 | 2/2017 | Rai et al. | |
| 2017/0083926 A1* | 3/2017 | Karcher | G06Q 30/0201 |
| 2017/0084198 A1* | 3/2017 | Thitithamasak | G09B 19/06 |
| 2017/0344939 A1 | 11/2017 | Linton et al. | |
| 2018/0060221 A1* | 3/2018 | Yim | G06F 9/44536 |
| 2018/0174069 A1* | 6/2018 | Childress | G06F 11/004 |
| 2018/0196643 A1 | 7/2018 | Dolby et al. | |
| 2018/0212770 A1 | 7/2018 | Costa | |
| 2018/0212966 A1 | 7/2018 | Costa | |
| 2018/0212971 A1 | 7/2018 | Costa | |
| 2018/0300083 A1 | 10/2018 | Volos et al. | |
| 2019/0095318 A1 | 3/2019 | Bahrami et al. | |

* cited by examiner

```
swagger: '2.0'
info:
  description: >-
    This is a sample Pet API Specification.
  version: 1.0.0
  title: My Pet
host: pet.io
basePath: /v1
security:
    - petstore_auth:
      - 'write:pets'
      - 'read:pets'
'/pet/{petId}':
  get:
    tags:
     - pet
    summary: Find pet by ID
    description: Returns a single pet
    operationId: getPetById          ←———————— 402
    produces:
     - application/xml
     - application/json
    parameters:
     - name: petId
       in: path
       description: ID of pet to return  ←———————— 404
       required: true
       type: integer
       format: int64
    responses:    ←————————————————— 406
      '200':
        description: successful operation
        schema:
          $ref: '#/definitions/Pet'
      '400':
        description: Invalid ID supplied
      '404':
        description: Pet not found
```

| | A | B | C | D | E | F | G | H | I | J | K |
|---|---|---|---|---|---|---|---|---|---|---|---|
| 1 | sessionid | testtype | heuristic | httptype | domain | endpoint | auth_id | operation | requestparam1 | requestparamtype1 | requestvalue1 |
| 2 | 12 | functional | positive | https | pet.io | /v1/pet | testID | POST | body | Object | {"pet":{"id":"2","name":"Fluffy","status":"Healthy"}} |
| 3 | 13 | functional | positive | https | pet.io | /v1/pet/{id} | testID | GET | id | integer | 2 |
| 4 | 14 | security | sql_injection | https | pet.io | /v1/pet/{id} | testID | GET | id | integer | 1;DROP TABLE users |
| 5 | 15 | functional | negative_emptystring | https | pet.io | /v1/pet/{id} | testID | GET | id | integer | null |

516, 518, 520, 522, 524, 526

| | L | M | N | O | P | Q | R |
|---|---|---|---|---|---|---|---|
| 1 | responsecode | responsemsg | responsetime | result | result_feedback | api_spec | api_description |
| 2 | 201 | Created | 0.04 | Pass | | pet | Add a new pet to the store |
| 3 | 404 | Not Found | 0.03 | Fail | Pet should've been found from a POST in the previous request | pet | Add a new pet to the store |
| 4 | 404 | Not Found | 0.22 | Pass | | pet | Add a new pet to the store |
| 5 | 404 | Not Found | 0.22 | Pass | | pet | Add a new pet to the store |

528, 530

| | S | T | U | V | W | X | Y | Z | AA | AB | AC |
|---|---|---|---|---|---|---|---|---|---|---|---|
| 1 | api_consumes1 | api_consumes2 | api_produces1 | api_produces2 | api_response1 | api_response2 | api_response3 | api_response4 | api_response5 | api_securityscope1 | api_securityscope2 |
| 2 | application/json | application/xml | application/xml | application/json | 400 | 404 | 405 | 201 | 200 | write:pets | read:pets |
| 3 | application/json | application/xml | application/xml | application/json | 400 | 404 | 405 | 201 | 200 | write:pets | read:pets |
| 4 | application/json | application/xml | application/xml | application/json | 400 | 404 | 200 | | | write:pets | read:pets |
| 5 | application/json | application/xml | application/xml | application/json | 400 | 404 | 200 | | | write:pets | read:pets |

FIG. 5

METHOD, APPARATUS, AND COMPUTER PROGRAM PRODUCT FOR PREDICTIVE API TEST SUITE SELECTION

CROSS-REFERENCE TO RELATED APPLICATIONS

This application is a continuation of U.S. application Ser. No. 17/207,036, titled "METHOD, APPARATUS, AND COMPUTER PROGRAM PRODUCT FOR PREDICTIVE API TEST SUITE SELECTION, filed Mar. 19, 2021, which is continuation of U.S. application Ser. No. 16/002,514, titled "METHOD, APPARATUS, AND COMPUTER PROGRAM PRODUCT FOR PREDICTIVE API TEST SUITE SELECTION," filed Jun. 7, 2018, which claims priority to U.S. Provisional Application No. 62/517,052 filed Jun. 8, 2017, the contents of all of which are hereby incorporated herein by reference in their entirety.

BACKGROUND

An application programming interface (API) is a set of subroutine definitions, protocols, and tools for building application software. Put another way, an API is a set of clearly defined methods of communication between various software components. An API may be for a web-based system, operating system, database system, computer hardware or software library. An API specification can include specifications for routines, data structures, object classes, variables or remote calls. Testing and validating representational state transfer (RESTful) application program interfaces (APIs) can be time consuming due to delays generated by test design, execution, and planning. Through applied effort, ingenuity, and innovation, many of these identified problems have been solved by developing solutions that are included in embodiments of the present disclosure, many examples of which are described in detail herein.

BRIEF SUMMARY

Embodiments of the present disclosure relate to concepts for selecting test suites for APIs. In one embodiment, a computing entity or apparatus is configured to receive test patterns and heuristics, receive an input API, the input API comprising API specifications, parse the input API to extract the API specifications, and based at least on the extracted API specifications and the test patterns and heuristics, select a test suite, wherein the test suite is programmatically generated using a machine learning model and comprises one or more test routines, one or more data values, and one or more expected results.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

Figure 1:
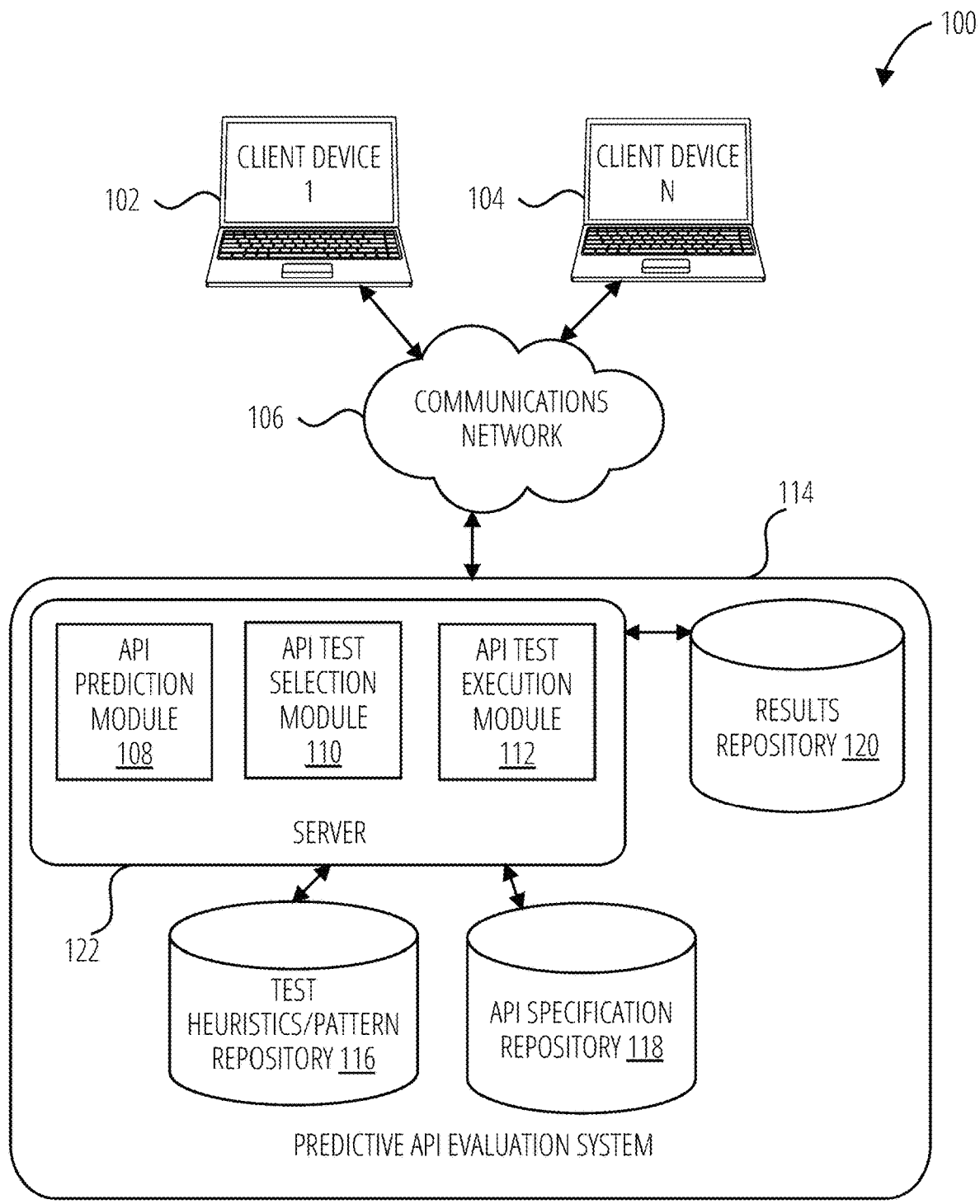
Figure 2:
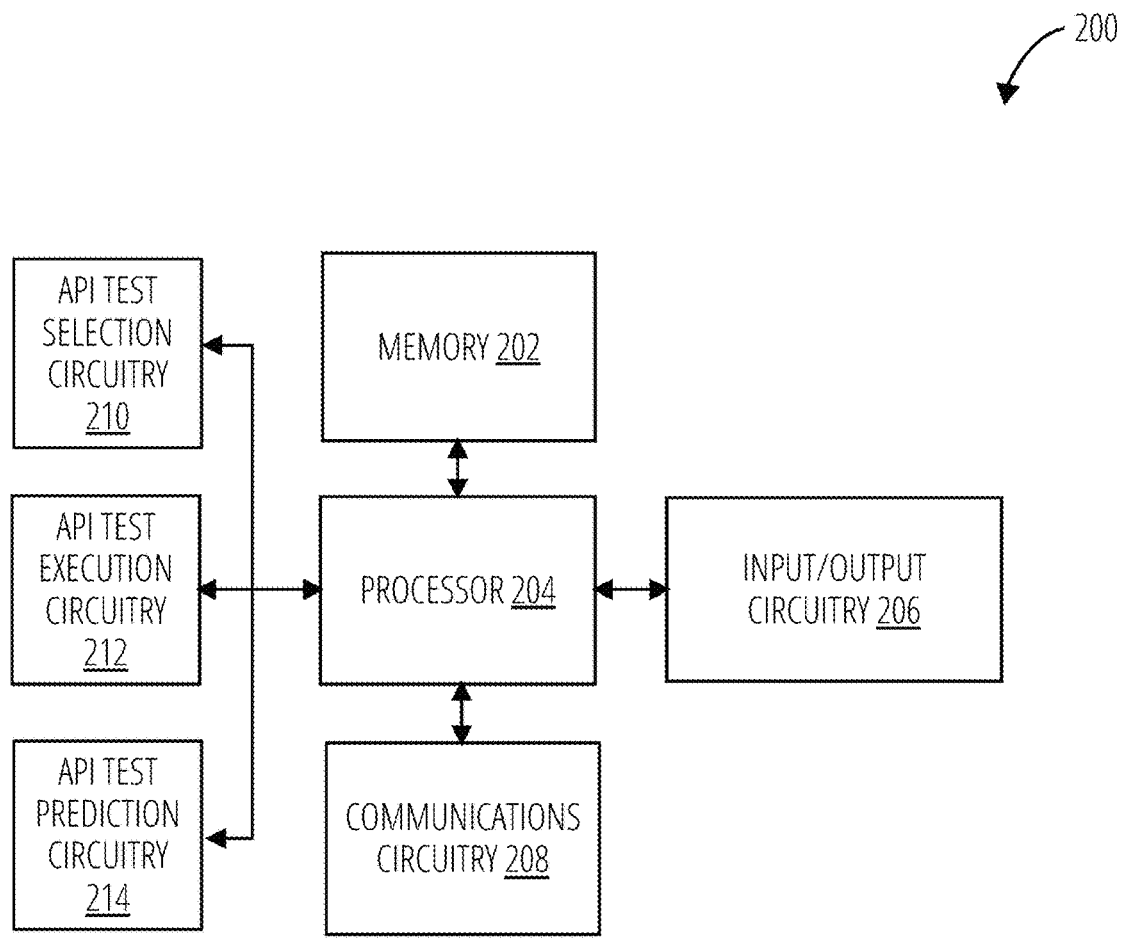
Figure 3:
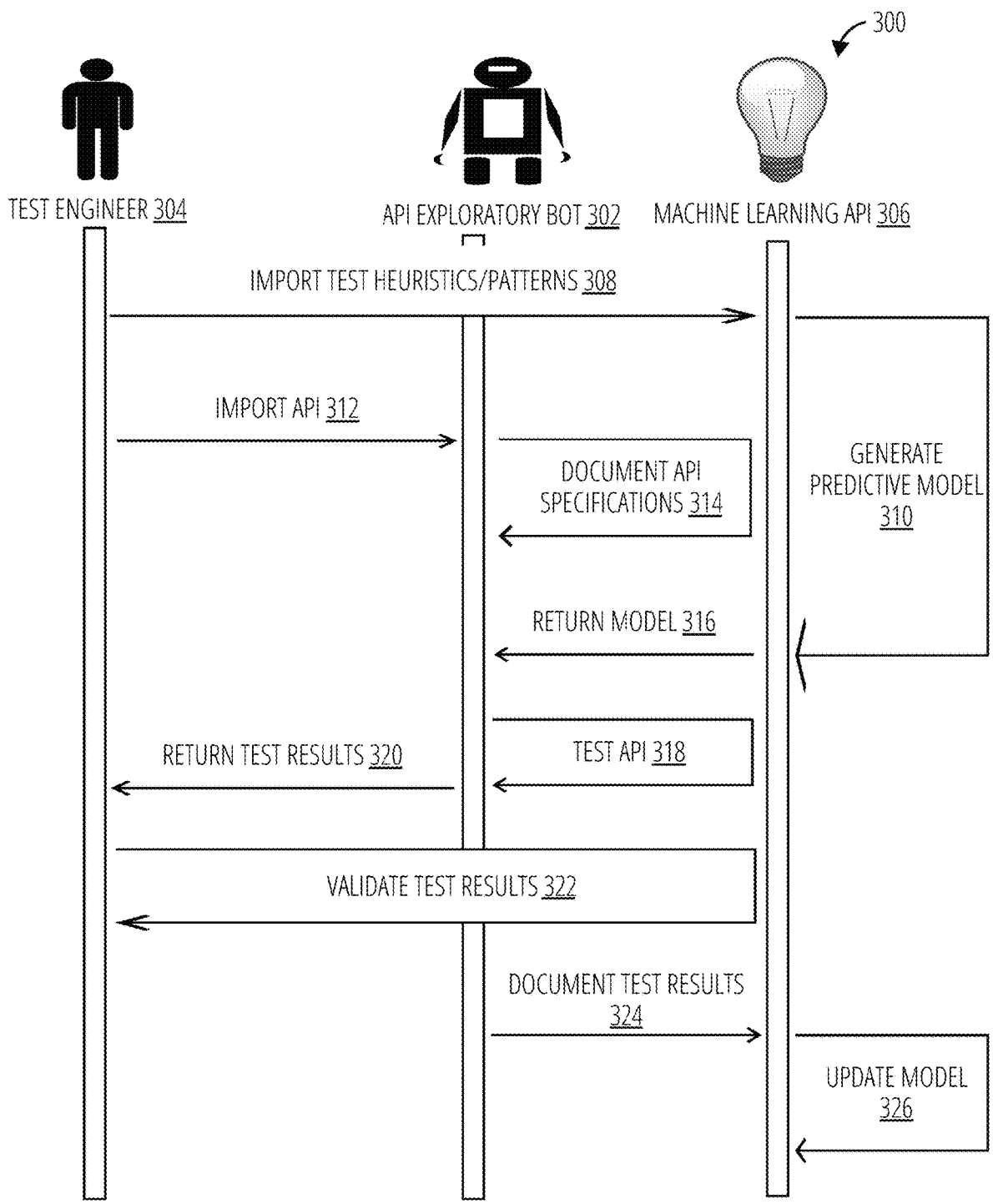

Having thus described the disclosure in general terms, reference will now be made to the accompanying drawings, which are not necessarily drawn to scale, and wherein:

FIG. 1 is a system architecture diagram of system configured to practice embodiments of the present disclosure;

FIG. 2 is an exemplary schematic diagram of a computing entity according to one embodiment of the present disclosure;

FIG. 3 is an exemplary sequence diagram illustrating an exemplary method in accordance with some embodiments of the present invention;

FIG. 4 illustrates an example API specification;

FIG. 5 illustrates example test results represented as an excel file; and

Figure 6:
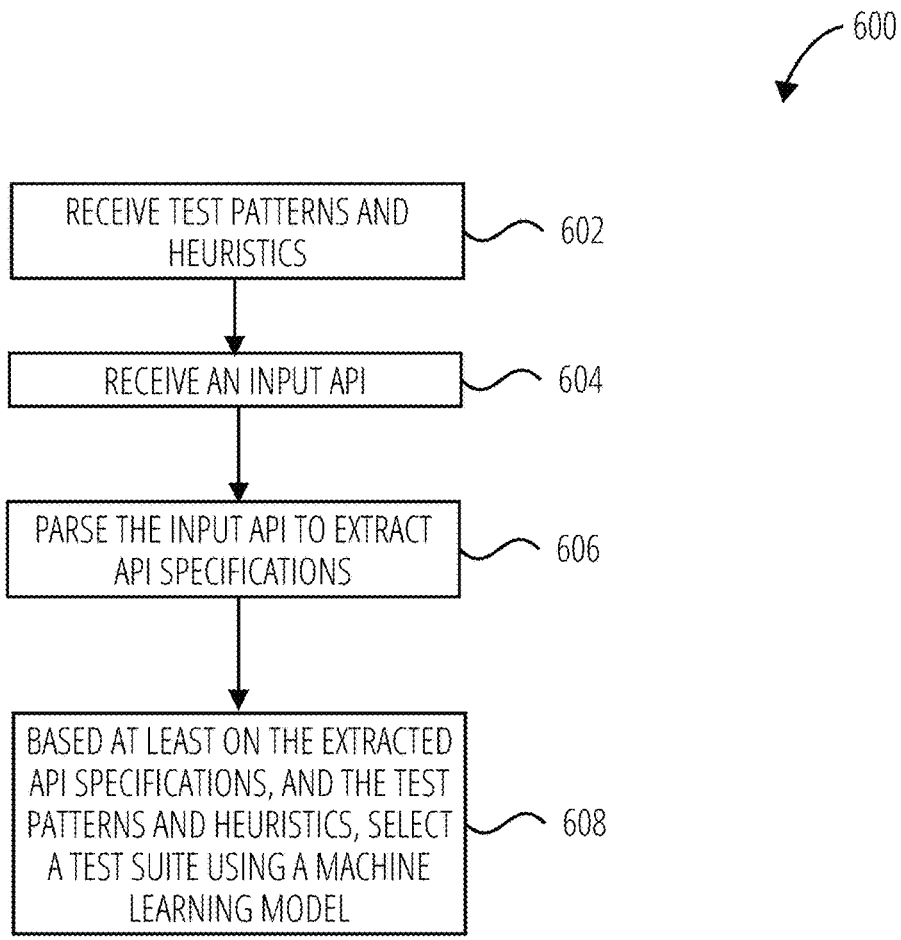

FIG. 6 is a flow chart of an exemplary process for API test suite selection for use with embodiments of the present disclosure.

DETAILED DESCRIPTION

Various embodiments of the present disclosure now will be described more fully hereinafter with reference to the accompanying drawings, in which some, but not all embodiments of the disclosure are shown. Indeed, the disclosure may be embodied in many different forms and should not be construed as limited to the embodiments set forth herein; rather, these embodiments are provided so that this disclosure will satisfy applicable legal requirements. The term "or" is used herein in both the alternative and conjunctive sense, unless otherwise indicated. The terms "illustrative" and "exemplary" are used to be examples with no indication of quality level. Like numbers refer to like elements throughout.

Overview

Various embodiments of the disclosure generally relate to a selection system for API test suites. The methods, apparatus and computer program products described herein are operable to select a test suite for an API based on test patterns and heuristics, API specifications, and API components of an input API. In some embodiments, the test suite is programmatically generated using a machine learning model and comprises one or more test routines, one or more data values, and one or more expected results.

API test selection and execution is tedious and time-intensive. The inventors have identified that the system resources and time allocated to such test selection and execution are easily exhausted and compromised as a result of these challenges. The inventors have determined that the ability to select the most effective test suite based upon a machine learning model would reduce the computing resources and time necessary to perform test suite selection, execution, and troubleshooting.

Exemplary Definitions

As used herein, the terms "programmatically expected," "infer," "inferred," or "inference" indicate machine prediction of occurrence of certain events. For example, a "programmatically expected" likelihood may be represented by a value determined by machine prediction specifying whether a policy transaction will occur in a future network period. The value may be expressed as a percentage (e.g., between 0-100% or between 0.00-1.00) or as a unitless value defined on a closed-ended scale (e.g., between 0-10) or an open ended scale (having a minimum value or having a maximum value).

The term "API" in this context refers to a set of subroutine definitions, protocols, and tools for building application software. An API may be for a web-based system, operating system, database system, computer hardware or software library. An API specification can include specifications for routines, data structures, object classes, variables or remote calls usable in association with the API (e.g., as inputs to the API, as a component of the API, and/or the like). RESTful or REST is a type of API and is a set of rules and standards for how to build a web API using uniform resource locators (URLs) and the hypertext transfer protocol (HTTP) structure. RESTful APIs are made up of requests and responses. Examples of RESTful HTTP request methods include retrieve, create, update, and delete functions to the server to which the server replies with a RESTful HTTP response.

The terms "machine learning model," "machine learning models," "predictive models" or "machine learning" in this context refers to statistically based models that are trained according to data sets generated and/or otherwise provided from prior test execution results and test heuristics provided to them from external sources and/or from sample data sets generated for training purposes. Data sets generated based on prior test execution results may be assembled from a plurality of a prior test execution results to provide larger data sets for use in training a machine learning model. According to certain embodiments, the models are trained in a supervised or semi-supervised manor. The models can then be called by an interfacing application or system and return a prediction according to what data the model is designed to predict. Examples of predicted values include but are not limited to:

A value indicative of a likelihood of the test result being a defect;

A value or other identifier indicative of a predicted preferred test or tests to execute based on a given specification;

A value or other identifier indicative of predicted preferred operations, data types, heuristics, and/or values to uses in a test based on a specification; and One or more values indicative of predicted variances in performance of the API response times.

The terms "client device" in this context refers to computer hardware and/or software that is configured to access a service made available by a server. The server is often (but not always) on another computer system, in which case the client device accesses the service by way of a network. Client devices may include, without limitation, smart phones, tablet computers, laptop computers, wearables, personal computers, enterprise computers, and the like.

The term "correctness" in this context refers to how well an API adheres to its specifications.

The terms "test," "testing," and "validation" in this context refer to executing a program or application with the intent of finding defects, and verifying that the program or application is fit for use.

The term "likelihood" in this context refers to a measure of probability for occurrence of a particular event. In some implementations, the machine predictions discussed above are based, at least in part, on the "likelihood" that an event will occur. A likelihood may be expressed as a value representative of a determined likelihood that an event will occur.

The terms "data," "content," "information," and similar terms in this context refer to data capable of being transmitted, received, and/or stored in accordance with embodiments of the present disclosure. Thus, use of any such terms should not be taken to limit the spirit and scope of embodiments of the present disclosure. Further, where a computing device is described herein to receive data from another computing device, it will be appreciated that the data may be received directly from another computing device or may be received indirectly via one or more intermediary computing devices, such as, for example, one or more servers, relays, routers, network access points, base stations, hosts, and/or the like, sometimes referred to herein as a "network." Similarly, where a computing device is described herein to send data to another computing device, it will be appreciated that the data may be sent directly to another computing device or may be sent indirectly via one or more intermediary computing devices, such as, for example, one or more servers, relays, routers, network access points, base stations, hosts, and/or the like.

The term "heuristics" in this context refers to techniques for problem solving, learning, and/or discovery which may be implemented via a computer-based machine learning algorithm and may be utilized to determine at least one solution to a defined problem type. Computational heuristics may be defined with reference to a particular problem type for which the heuristic has been constructed to solve. For example, certain heuristics may be utilized for identifying incorrect coding terminology utilized for a defined coding language. Moreover, these heuristics may be embodied as executable software programs configured for receiving or retrieving various data values as input, and which may provide one or more data values representative of identified defects and/or proposed solutions to identified defects that arise from the input.

The term "test suite" in this context refers to a collection of test cases that are intended to be used to test or validate an API to show that it has some specified set of behaviors or meets a certain level of "correctness". A test suite may be embodied as one or more executable software programs configured to subject a selected API to the corresponding test cases.

The term "defect" in this context refers to an error, flaw, failure, fault, or bug in an API that causes it to produce an incorrect or unexpected result, or to behave in unintended ways. In certain embodiments, a defect may cause an API to produce unusable data having improper formatting, or may cause an API to entirely fail, thereby rendering the API unusable for an intended purpose.

Example System Architecture

Methods, apparatuses, and computer program products of the present disclosure may be embodied by any of a variety of devices. For example, the method, apparatus, and computer program product of an example embodiment may be embodied by a networked device (e.g., an enterprise platform), such as a server or other network entity, configured to communicate with one or more devices, such as one or more client devices. Additionally or alternatively, the computing device may include fixed computing devices, such as a personal computer or a computer workstation. Still further, example embodiments may be embodied by any of a variety of mobile devices, such as a portable digital assistant (PDA), mobile telephone, smartphone, laptop computer, tablet computer, wearable, or any combination of the aforementioned devices.

FIG. 1 illustrates an example computing system within which embodiments of the present disclosure may operate.

Client devices 102-104 may access a predictive API evaluation system 114 via a Communications Network 106 (e.g., the Internet, LAN, WAN, or the like). The predictive API evaluation system 114 may comprise a server 122 in communication with one or more databases or repositories 116, 118, 120.

The server 122 may be embodied as a computer or computers as known in the art. The server 122 may provide for receiving of electronic data from various sources, including but not necessarily limited to the client devices 102-104 and/or data stores accessible to the server 122. For example, the server 122 may be operable to receive heuristics, APIs, and/or evaluation requests and/or selections thereof provided by the client devices 102-104. The server 122 may facilitate the prediction and selection of tests for a given API. The server 122 may include an API Prediction Module 108 for predicting the most effective tests to execute on an API, an API test Selection Module 110 for selecting a suite of tests based upon knowledge gained by the API Prediction Module 108, and an API test execution module 112 for executing any of the selected tests on the given API.

In some embodiments, an API Prediction Module 108 comprises or is otherwise configured to execute one or more machine learning APIs. The machine learning APIs may be built using machine learning models that leverage data related to test heuristics and previous test results (or sample test results utilized for training of machine learning APIs) as inputs to determine one or more of the following characteristics: field values to use for a given operation and data type in a test; if a result is predicted to pass/fail given a set of request inputs; which of a plurality of available tests to execute; which datatype(s) and operations to test; variances in performance; and/or the like. In certain embodiments, the API prediction module 108 may be configured to generate an output comprising one or more values indicative of one or more of the characteristics (e.g., values indicative of the likelihood of a predicted result occurring or the likelihood of a particular recommendation to provide desired results). In an example embodiment, the API prediction module 108 utilizes classification algorithms in machine learning, such classification algorithms include, but are not limited to, linear classifiers, decision trees, random forest, neural networks, or nearest neighbor.

In some example embodiments, the API Prediction Module 108 is configured to receive test heuristics and test patterns as inputs, which may comprise test heuristics and test pattern data retrieved from the test heuristics/pattern repository 116. The input of test heuristics and test pattern data may occur in response to a trigger event, such as receipt of user input, a user request, and/or the like. For example, the test heuristics and test pattern data may be input in response to a request, such as a request for details relating to the most effective test suite for APIs. Additionally or alternatively, the API Prediction Module 108 may be configured to receive or input test heuristics and test pattern data continuously or semi-continuously, such as via a data stream, and determine the applicability or importance of the test heuristics and test pattern data on the APIs for test.

The API prediction module 108 may be configured to determine an applicability or importance level between the test heuristics and test pattern data and a selected API to test. In order to determine the applicability or importance level, the API Prediction Module 108 may access the API specification contained in the API Specification Repository 118. The API specification may be embodied as an executable program file, a document file, and/or the like. The API specification file or document, or one or more related artifacts, may contain detailed information indicative of the functional and/or expected behavior of the API, as well as the design and support datatypes and data values.

The API prediction module 108 may parse the input API specification file to extract API components. In some examples the test heuristics/pattern repository 116 may identify one or more tests recommended for execution with the API, as well as a related importance level associated with each of the one or more recommended tests. For example, the API prediction module 108 may parse an API specification file to determine various components of an API indicating the API is utilized in an e-commerce context, and may recommend a test for combining available filters and sort options executable with the API to identify potential defects with respect to an e-commerce website, and the API prediction module 108 may assign a high importance indicator to this recommended test based on machine learning outputs. Following this same example, the API prediction module 108 may generate an output indicating that test scenarios related to combining filters and sort options may be labeled as important, whereas other test scenarios not related to combining filters and sort options may not be marked as important in testing e-commerce website APIs. In some example embodiments, each of the test scenarios, various testing techniques, data values, and/or approaches to use based on a datatype, integration step, and/or operation leveraged in the test scenario may be given an importance, applicability and/or otherwise may be weighted based on the importance/applicability level of the relationship between the input API and/or the test heuristics and test pattern data.

In some embodiments, API test selection module 110 receives input data continuously or semi-continuously, such as via a data stream, and determines which tests to execute, data values to use, and expected results. For example, input data may take the form of a machine learning model representing test patterns and heuristics, API specifications, and API artifacts. The API test selection module 110 is configured to process data from the input API and the test heuristics and test pattern data by determining an importance/applicability level of one or more test scenarios and/or testing techniques, using the API prediction module 108, by comparing the importance/applicability level associated with the data values, and/or approaches to use based on a datatype, integration step, and/or operation leveraged in the test scenario with the received API artifact and extracted API components.

The API test selection module 110 may identify and/or generate a test suite from the plurality of test scenarios based on the importance/application level of the input data (e.g., whether the input data correlates to performance data and test rules, satisfies a threshold and/or the like). The test suite may be generated based on a model that was built based on machine learning, modeling, manually, and/or the like.

As described, the API test selection module 110 may utilize available data, such as test heuristics and patterns and past execution results to provide a machine learning model with training data so that the most effective API test suite may be selected for a given API. The resulting API test suite is generated to test important aspects of a given API, based on the determined importance of various aspects of the given API as indicated by the API test selection module 110 and/or API prediction module 108. This significantly increases the overall speed for testing a given API by focusing only on those aspects of the API deemed important by the included machine learning models, and also decreases the processing resources required for performing a full suite of tests on a given API by decreasing the total number of tests performed and decreasing the amount of processing resources expended in selecting one or more tests to be performed.

Naturally, the ability to accurately select a smaller test suite with high effectiveness impacts resource availability and efficient use thereof. Accordingly, there exists a dire market need for methods and systems that can accurately select test suite components and expected results when validating API functionality, as well as increase speed to market.

In some examples, the model may take the form of a data model that defines or otherwise describes how data is connected, related, or should otherwise be processed. In further examples, a model may be hierarchical/tree knowledge representation that includes rules that are a combination of features and values that characterize the underlying knowledge or data to return a prediction, such as predicting the most effective tests to execute on the input API. Furthermore, the model comprises a plurality of rules, wherein the plurality of rules are a combination of features and values that characterize predicted values. Examples of predicted values include but are not limited to: a likelihood of the test result being a defect; which tests to execute based on a given specification; what operations, data types, heuristics, values to uses in a test based on a specification; and variances in performance of the API response times.

Ultimately, the API test execution module 112 generates a virtual API exploratory bot to execute a test suite comprising one or more selected test scenarios with respect to a given API. The test scenarios to be executed may be automatically selected based on the API test selection module 110 (e.g., based on the relative importance score of each of a plurality of test scenarios identified for a particular API). In other embodiments, the test scenarios included within the executed test suite may be selected based at least in part on user input (e.g., selecting one or more recommended test scenarios identified by the API test selection module 110).

The API test execution module 112 may be further configured to generate a value indicative of the test effectiveness for a given test suite executed for a particular API. Test effectiveness may be scored based at least in part on the percentage of identified high value test scenarios or test cases executed for a given API. In other words, test effectiveness may provide a measure of the ability of a given test to identify defects in an API and/or the quality of a test suite. Accordingly, the API exploratory bot may be configured to operate in parallel with alternative API testing configurations (e.g., manual API testing by a software engineer) which may be utilized as datum for comparison of the results of the test suite executed by the API exploratory bot. As will be realized, because the API exploratory bot is configured with machine-learning aspects, this parallel operation of testing procedures may be performed only temporarily, during an initial learning stage of use of the API exploratory bot while the accuracy of the API exploratory bot improves.

Particularly during the initial learning stage, the API exploratory bot is configured to, using machine learning, investigate and apply corrective actions on improving the selected test scenarios of the test suite based on the test effectiveness percentage so that defect and vulnerability identification rate of the test suite grows more similar to the parallel API testing configurations (e.g., such that the test defect and vulnerability identification rate increases). During the learning period, the API exploratory bot is configured to evolve through machine-learning algorithms to pursue higher test effectiveness percentages. For example, if for an input API, the test effectiveness is 75%, it means that 25% of the defects were not identified by the API exploratory bot executing the selected test suite, and future executions of the API exploratory bot may utilize data obtained from the parallel API testing configurations to increase the effectiveness of the API exploratory bot and the selection process for selecting test scenarios to be included in a test suite.

The model may be input into and/or be created by a machine learning system to enable generation of the one or test suites based upon the knowledge gained by the API prediction module 108 and an API test execution module 112, such as using test domain knowledge from a test engineer (e.g., using test oracles) and/or previous testing experience (e.g., test heuristics/patterns) to be able to quickly design and execute tests simultaneously while also learning about the input API.

The databases or repositories 116-120 may be embodied as a data storage device such as a Network Attached Storage (NAS) device or devices, or as a separate database server or servers. The databases 116-120 include information accessed and stored by the server 122 to facilitate the operations of the predictive API evaluation system 114. For example, the databases 116-120 may include, without limitation, test heuristics/patterns, test results, API specifications, and/or the like.

Test heuristics/pattern repository 116 may include test patterns and heuristics which describe the various techniques, data values, and approaches to testing within the predictive API evaluation system 114. The techniques, data, values, and approaches to testing can be based upon one or more of a datatype, integration, step, or operation of an API within the predictive API evaluation system 114.

API specification repository 118 may include data detailing the functional and expected behavior of any given API, as well as the design of the API and datatypes of the API. The API specification repository 118 may further include artifacts such as code, classes, interfaces, documentation, or the like using any API and data types modeled or defined during the testing exploration process.

Results repository 120 may comprise a results file or data structure containing information related to API calls used in the various tests. The information may include the API calls inputs, operations, actual and expected responses, performance metrics, and test heuristics used. The results are assessed for validity and imported by the API prediction module as part of its machine learning.

The client devices 102-104 may be any computing device as defined above. Electronic data received by the server 122 from the client devices 102-104 may be provided in various forms and via various methods. For example, the client devices 102-104 may include desktop computers, laptop computers, smartphones, netbooks, tablet computers, wearables, and the like.

In embodiments where a client device 102-104 is a mobile device, such as a smart phone or tablet, the client device 102-104 may execute one or more "apps" to interact with the predictive API evaluation system 114. Such apps are typically designed to execute on mobile devices, such as tablets or smartphones. For example, an app may be provided that executes on mobile device operating systems such as iOS®, Android®, or Windows®. These platforms typically provide frameworks that allow apps to communicate with one another and with particular hardware and software components of mobile devices. For example, the mobile operating systems named above each provide frameworks for interacting with location services circuitry, wired and wireless network interfaces, user contacts, and other applications. Communication with hardware and software modules executing outside of the app is typically provided via application programming interfaces (APIs) provided by the mobile device operating system.

Additionally or alternatively, the client device 102-104 may interact with the predictive API evaluation system 114 via a web browser. As yet another example, the client device 102-104 may include various hardware or firmware designed to interface with the predictive API evaluation system 114.

Via an interaction method described above, the client device 102-104 may upload test heuristics and patterns to predictive API evaluation system 114.

Example Apparatus for Implementing Embodiments of the Present Disclosure

The server 122 may be embodied by one or more computing systems, such as apparatus 200 shown in FIG. 2. The apparatus 200 may include a processor 204, a memory 202, input/output circuitry 206, communications circuitry 208, API test selection circuitry 210, API test execution circuitry 212, and API test prediction circuitry 214. The apparatus 200 may be configured to execute the operations described below with respect to FIG. 3 and FIG. 6. Although these components 202-214 are described with respect to functional limitations, it should be understood that the particular implementations necessarily include the use of particular hardware. It should also be understood that certain of these components 202-214 may include similar or common hardware. For example, two sets of circuitry may both leverage use of the same processor, network interface, storage medium, or the like to perform their associated functions, such that duplicate hardware is not required for each set of circuitry.

The use of the term "circuitry" as used herein with respect to components of the apparatus should therefore be understood to include particular hardware configured to perform the functions associated with the particular circuitry as described herein. That is, the term "circuitry" should be understood broadly to include hardware and, in some embodiments, software for configuring the hardware. For example, in some embodiments, "circuitry" may include processing circuitry, storage media, network interfaces, input/output devices, and the like. In some embodiments, other elements of the apparatus 200 may provide or supplement the functionality of particular circuitry. For example, the processor 204 may provide processing functionality, the memory 202 may provide storage functionality, the communications circuitry 208 may provide network interface functionality, and the like.

In some embodiments, the processor 204 (and/or co-processor or any other processing circuitry assisting or otherwise associated with the processor) may be in communication with the memory 202 via a bus for passing information among components of the apparatus 200. The memory 202 may be non-transitory and may include, for example, one or more volatile and/or non-volatile memories. In other words, for example, the memory may be an electronic storage device (e.g., a computer readable storage medium). The memory 202 may be configured to store information, data, content, applications, instructions, or the like, for enabling the apparatus 200 to carry out various functions in accordance with example embodiments of the present disclosure.

The processor 204 may be embodied in a number of different ways and may, for example, include one or more processing devices configured to perform independently. Additionally or alternatively, the processor may include one or more processors configured in tandem via a bus to enable independent execution of instructions, pipelining, and/or multithreading. The use of the term "processing circuitry" may be understood to include a single core processor, a multi-core processor, multiple processors internal to the apparatus, and/or remote or "cloud" processors.

In an example embodiment, the processor 204 may be configured to execute instructions stored in the memory 202 or otherwise accessible to the processor. Alternatively, or additionally, the processor may be configured to execute hard-coded functionality. As such, whether configured by hardware or software methods, or by a combination thereof, the processor may represent an entity (e.g., physically embodied in circuitry) capable of performing operations according to an embodiment of the present disclosure while configured accordingly. Alternatively, as another example, when the processor is embodied as an executor of software instructions, the instructions may specifically configure the processor to perform the algorithms and/or operations described herein when the instructions are executed.

In some embodiments, the apparatus 200 may include input/output circuitry 206 that may, in turn, be in communication with processor 204 to provide output to the user and, in some embodiments, to receive an indication of a user input. The input/output circuitry 206 may comprise a user interface and may include a display and may comprise a web user interface, a mobile application, a client device, a kiosk, or the like. In some embodiments, the input/output circuitry 206 may also include a keyboard, a mouse, a joystick, a touch screen, touch areas, soft keys, a microphone, a speaker, or other input/output mechanisms. The processor and/or user interface circuitry comprising the processor may be configured to control one or more functions of one or more user interface elements through computer program instructions (e.g., software and/or firmware) stored on a memory accessible to the processor (e.g., memory 202, and/or the like).

The communications circuitry 208 may be any means such as a device or circuitry embodied in either hardware or a combination of hardware and software that is configured to receive and/or transmit data from/to a network and/or any other device, circuitry, or module in communication with the apparatus 200. In this regard, the communications circuitry 208 may include, for example, a network interface for enabling communications with a wired or wireless communication network. For example, the communications circuitry 208 may include one or more network interface cards, antennae, buses, switches, routers, modems, and supporting hardware and/or software, or any other device suitable for enabling communications via a network. Additionally or alternatively, the communication interface may include the circuitry for interacting with the antenna(s) to cause transmission of signals via the antenna(s) or to handle receipt of signals received via the antenna(s).

API test selection circuitry 210 includes hardware configured to select test modules for an input API. The API test selection circuitry 210 may utilize processing circuitry, such as the processor 204, to perform these actions. The API test selection circuitry 210 may send and/or receive data from API test execution circuitry 212 and/or API Test Prediction Circuitry 214. In some implementations, the sent and/or received data may be data identifying modules within an API and/or test modules for testing various modules within an API. It should also be appreciated that, in some embodiments, the API test selection circuitry 210 may include a separate processor, specially configured field programmable gate array (FPGA), or application specific interface circuit (ASIC). In some implementations, API test execution circuitry 212/API test prediction circuitry 214 described below, may be sub-circuitry belonging to API test selection circuitry 210. The API test selection circuitry 210 may be implemented using hardware components of the apparatus configured by either hardware or software for implementing the functions described herein.

API test execution circuitry 212 includes hardware configured to execute selected tests on an input API. The API test execution circuitry 212 may utilize processing circuitry, such as the processor 204, to perform these actions. However, it should also be appreciated that, in some embodiments, the API test execution circuitry 212 may include a separate processor, specially configured FPGA, or ASIC for performing the functions described herein. API test execution circuitry 212 may be implemented using hardware components of the apparatus configured by either hardware or software for implementing these planned functions.

API test prediction circuitry 214 includes hardware configured to predict, based upon learned components of an input API, the most effective tests to execute on the API. In some embodiments, the prediction is a likelihood that the selected tests will result in the best test coverage for the API. The API test prediction circuitry 214 may utilize processing circuitry, such as the processor 204, to perform these actions. However, it should also be appreciated that, in some embodiments, the API test prediction circuitry 214 may include a separate processor, specially configured FPGA, or ASIC for performing the functions described herein. API test prediction circuitry 214 may be implemented using hardware components of the apparatus configured by either hardware or software for implementing these planned functions.

As will be appreciated, any such computer program instructions and/or other type of code may be loaded onto a computer, processor or other programmable apparatus's circuitry to produce a machine, such that the computer, processor or other programmable circuitry that execute the code on the machine create the means for implementing various functions, including those described herein.

It is also noted that all or some of the information presented by the example displays discussed herein can be based on data that is received, generated and/or maintained by one or more components of the apparatus 200. In some embodiments, one or more external systems (such as a remote cloud computing and/or data storage system) may also be leveraged to provide at least some of the functionality discussed herein.

As described above and as will be appreciated based on this disclosure, embodiments of the present disclosure may be configured as methods, mobile devices, backend network devices, and the like. Accordingly, embodiments may comprise various means including entirely of hardware or any combination of software and hardware. Furthermore, embodiments may take the form of a computer program product on at least one non-transitory computer-readable storage medium having computer-readable program instructions (e.g., computer software) embodied in the storage medium. Any suitable computer-readable storage medium may be utilized including non-transitory hard disks, CD-ROMs, flash memory, optical storage devices, or magnetic storage devices.

Example Functionality

Referring now to FIG. 3, the process 300 illustrates an example process of exploratory testing to perform test suite selection, execution, and troubleshooting.

The process 300 starts at step 308, where a test engineer 304 via client devices imports test heuristics/patterns for use against an API to learn the most effective and efficient way to test based on past test cycles through predictive modeling over time. The test heuristics/patterns imported provide information regarding past behavior of the API under test and/or other similar APIs, such as various techniques, data values, and approaches of the API based on a datatype, integration step, or operation leveraged in the test.

The system automatically engages with a machine learning API 306 such as the BigML platform to create a machine learning predictive model at step 310. According to an example implementation of the invention, the BigML platform is used, however, it is contemplated that other machine learning APIs known in the art may also be used additionally or in place of the BigML platform. Here, the test engineer 304 or the API exploratory bot 302 will create a source file (e.g., .csv (comma separated values) or .aff (advanced forensics format)) that contains the test heuristics/patterns that is imported to BigML. Once the source file is provided to BigML, the BigML platform is configured to prepare a plurality of datasets that BigML will use to create a predictive model. Datasets are transformed raw data from the source file that is ready to be used by the BigML platform. In an example embodiment, test heuristics/patterns may be replaced with more recent information, thereby increasing the level of test effectiveness and efficiency. Thus, the test heuristics/patterns may be periodically updated to reflect the recent predictive modeling changes.

In step 312, the system receives the API to be tested, for example, as user input provided by the test engineer 304. The API exploratory bot 302 automatically discovers and/or documents API specifications as shown in step 314. For example, the API exploratory bot 302 is configured to act as a crawler through the provided API (e.g., through the executable API file), to find and learn API descriptions. API descriptions include elements that describe the API and its functionality, such as endpoints and parameters used in operations (e.g., requests and responses) involving the endpoints. In some example embodiments, the system may use an API specification tool such as Swagger to create a document that describes the API. The API exploratory bot 302 will then consume the document to facilitate exploratory testing by determining which operations to call, which datatypes to send, which status codes to expect in return, etc. It should be understood that the API exploratory bot 302 may be configured to crawl API specification documents generated via any of a variety of tools, document processors, word processors, and/or the like to identify relevant portions of the API specification.

In step 316, the API exploratory bot 302 receives the predictive model. The initial predictive model being based on the imported test heuristics/patterns which may then be transformed by exploratory testing conducted by the API exploratory bot 302. Since test heuristics/patterns are fed into the machine learning API 306, the predictive models include learned properties of tests results to determine the following: one or more field values to use for a given operation and one or more of a datatype in a test; whether a test result should pass or fail given a set of request inputs; which high-value tests to execute; which datatype and operations to test; and/or variances in performance. Properties learned from test results and test heuristics/patterns may be used to explore and focus on testing scenarios directed towards specific types of bugs or defects that are of importance or interest and/or testing scenarios that have not yet been explored.

The API exploratory bot 302 now equipped with knowledge from both the predictive model and API specification data tests the API 318 using focused exploratory testing so as to test the API rapidly, to reveal unintended consequences of API design decisions and risks not considered in advance. In doing so, large amounts of information is gathered by the API exploratory bot 302 very quickly and is fed back to the machine learning API 306. The learning used by the API exploratory bot 302 directs test execution and test generation by capturing what has been observed so far in the testing process and how to proceed with test cycles based on past cycles and additional information from the API and predictive model. The API exploratory bot 302 may further provide feedback on formed hypotheses about operations and endpoints of the API specification produced by the predictive model. For example, if an operation to get a petID comes after an operation that posts a petObject having the petID, the predictive model hypotheses or classifies a positive test run according to previous test heuristics/patterns using classification algorithms in machine learning. Should the test run provide a negative outcome, the API Exploratory Bot 302 may provide feedback that the petID should have been found from the post operation in the previous request. As will be appreciated the test suite is updated based on the learning by the predicative model and the feedback provided by the API Exploratory Bot 302. For example, based on the negative outcome in the get petID test, the test suite will run through other getID operations having a variety of data values. With time and usage, the system keeps learning and the test suite is updated.

Additionally, the system is configured to return test results to the test engineer 304 and the API exploratory bot 302 as shown in step 320 to validate test results 322. In step 324 the test results are documented and exported to the machine learning API 306 in order to update the predictive model as shown in step 326.

The use of a machine learning provides the test engineer 304 and the API exploratory bot 302 the ability to refine classification capabilities produced through machine learning over time, consequently allowing more accurate results. To allow such refinement, both positive and negative test results are provided to the machine learning API 306 to identify patterns or features not captured in the API specification and/or test heuristics/patterns.

Example Artifacts Generated by the System

FIGS. 4 and 5 illustrate various elements of example APIs and test suites according to some embodiments of the present invention.

Referring now to FIG. 4, an example API specification 400 is shown. The API specification 400 includes, in pertinent part, operation id 402, operation description 404, and three responses 406. The API specification 400 may also include the base path and endpoint, security authorization of the operation, the parameters of the operation, response code and response descriptions, among other elements typically found in an API specification. The API exploratory bot 302 may crawl through the API specification to discover operations and endpoints for testing. The API exploratory bot 302 may further perform performance testing, security testing, and the like against the API, using machine learning and test heuristics/patterns to learn the most effective and efficient way to test the API based on past test cycles through predictive modeling over time.

Referring now to FIG. 5, the test results 500 illustrate an example test suite executed by the system. The test results 500 may include among other things a session id 502, a test type 504, a test heuristic 506, an endpoint 508, an operation 510, a request parameter 512, a request value 514, a response code 516, a response message 518, a result 520, result feedback 522, the API specification 524, the API description 526, and API security score 528 and 530. The session id 502 identifies the particular API operation call. The test type 504 identifies the type of test, the core functionality of the test (e.g., business logic), testing for potential security vulnerabilities, performance testing, etc. The test heuristic 506, derived from the predictive model, hypothesis the result of the operation. The endpoint 508 indicates an object or set of objects exposed (e.g., /api/v1/pet/{id}). The operation 510 identifies the type of API method call. The request parameter 512 identifies the type of element in the request (e.g., object, integer, list, etc.). The request value 514 identifies the data value in the request, typically satisfying the request parameter. The response code 516 identifies the Hypertext Transfer Protocol (HTTP) standard response code to indicate a response from the server. The response message 518 provides a short description associated with the response code 516. The result 520 indicates whether the test passed or failed. The result feedback 522, generated by the system, provides an explanation of why the test failed. The remaining items 524, 526, 528, and 530 provide information about the API specification such as name, description and security scope.

As previously mentioned, the API exploratory bot 302 relies on the imported test heuristics/patterns of how the API should or is predicted to behave in response to API operation requests. Common tests performed on the API operation requests include verifying a return value of the API operation based on an input condition, verifying if the API operation does not return anything, verifying if the API operation triggers another event or another API operation, verifying if the API call is updating any data, and the like. There are two major test types: positive and negative. Positive tests show how the API operation is expected to work. If an error is encountered during positive testing, the test fails. Negative testing ensures that the API can gracefully handle invalid input or unexpected behavior. In negative testing, exceptions are expected—they indicate that the API handles invalid input correctly.

As shown in the results 500, the test suite identified and executed a number of tests, one or more of field values to use for a given operation and one or more datatypes; if a test result should pass or fail given a set of request inputs; which datatype and operations to test and in what sequence.

According to the test suite, the test suite started with a post operation to create a new pet object with the values identified in request value 514. The post operation is successful, meaning the new pet object is added. Accordingly, the system identifies and executes a number of get operations to read or retrieve a pet object by pet id. In other words, the system identifies high values tests to execute related to the previous operation. In this case, after a post operation, one or more get operation tests are executed to verify the post operation. As shown by result 520 the get id {2} operation failed. The API exploratory bot 302 analyzes the result and provides result feedback 522 that the pet should have been found from a post operation in the previous request. As such, the test results 500 enables a test engineer 304 to quickly and easily recognize bugs in the API and the API Exploratory Bot 302 will continue with testing other get operations with differing data values in order to uncover the root cause.

Example Processes for API Test Suite Selection

FIG. 6 is a flow chart of an example process 600 for API test suite selection for use with embodiments of the present disclosure.

Process 600 begins with receiving test patterns and heuristics 602. In some embodiments, the test patterns and heuristics comprise one or more techniques, one or more data values, and one or more approaches to use in a test suite; and wherein the test patterns and heuristics are based on one or more of a datatype, integration, step, and operation. In some example embodiments, the test heuristics/pattern repository 116 may provide test patterns and test heuristics automatically. Alternatively or additionally, a test engineer 304, via client devices, may choose specific test heuristics and patterns to import to the predictive API evaluation system 114. Detection of test bugs and vulnerabilities rely on test heuristics and patterns of how the target API behaves in response to specially crafted test routines. In some examples, the test heuristics and patterns may provide data related to normal behaviors in an API and/or information related to anomalous behaviors and/or the like.

Process 600 continues with receiving an input API 604 for testing, where the input API comprises API specifications. In some embodiments, API specifications comprise descriptions of functional characteristics and expected functionality of the input API, and design and support datatypes of the input API. In some example embodiments, the API specification repository 118 may provide API specifications automatically. Alternatively or additionally, a test engineer 304, via client devices, may choose specific API specifications to import to the predictive API evaluation system 114. In some embodiments, the API specifications comprise API components such as one or more of routines, data structures, object classes, variables and remote calls.

Process 600 continues with parsing the input API to extract the API specifications. In some embodiments, swagger parser is used to parse the input API (although it should be understood that in certain embodiments the parser may be configured for parsing data generated via any of a variety of tools). In some example embodiments, the API exploratory bot 302 is configured to discover and extract the API specifications and API components.

Process 600 continues with selecting a test suite based at least on the extracted API specifications, and the test patterns and heuristics 608. In some embodiments, the selected test suite is programmatically generated using a machine learning model and comprises one or more test routines, one or more data values, and one or more expected results.

In some embodiments, the test suite is executed on the input API and test results from the execution are exported to the machine learning model. In some embodiments, the test results include one or more of API calls used during the test execution, inputs, operations, actual results, expected results, performance metrics, and test heuristics used.

In some embodiments, the predictive API evaluation system 114 applies the machine learning model for producing one or more hypothesis about the test suite, and in accordance with the one or more hypotheses, generate new test routines to be added to the test suite. FIG. 5 element 506 provides an example of hypotheses generated via machine learning and applying test heuristics. The predictive API evaluation system 114 executes the test suite and confirms or denies the hypotheses. In an instance when a hypothesis is contradicted, the predictive API evaluation system 114 automatically assess one or more of API calls used during execution of the test suite, inputs, operations, actual results, expected results, performance metrics, and test heuristics used and/or output to determine and provide information about the contradicted hypothesis which, in turn, is learned and used as a basis for focused testing to identify other bugs or vulnerabilities.

In some embodiments, the machine learning model determines one or more of field values to use for a given operation and data type in a test, expected results given a set of request inputs, which high-value tests to execute, which datatype and operations to test, and variances in performance. In some embodiments, the machine learning model comprises a plurality of machine learning models. In some embodiments, the input API is written in one of XML or YAML.

Additional Implementation Details

Although an example processing system has been described in FIG. 2, implementations of the subject matter and the functional operations described herein can be implemented in other types of digital electronic circuitry, or in computer software, firmware, or hardware, including the structures disclosed in this specification and their structural equivalents, or in combinations of one or more of them.

Embodiments of the subject matter and the operations described herein can be implemented in digital electronic circuitry, or in computer software, firmware, or hardware, including the structures disclosed in this specification and their structural equivalents, or in combinations of one or more of them. Embodiments of the subject matter described herein can be implemented as one or more computer programs, e.g., one or more modules of computer program instructions, encoded on computer storage medium for execution by, or to control the operation of, information/data processing apparatus. Alternatively, or in addition, the program instructions can be encoded on an artificially-generated propagated signal, e.g., a machine-generated electrical, optical, or electromagnetic signal, which is generated to encode information/data for transmission to suitable receiver apparatus for execution by an information/data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described herein can be implemented as operations performed by an information/data processing apparatus on information/data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA or an ASIC. The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them.

The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or information/data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described herein can be performed by one or more programmable processors executing one or more computer programs to perform actions by operating on input information/data and generating output. Processors suitable for the execution of a computer program include, by way of example, both general and special purpose microprocessors, and any one or more processors of any kind of digital computer. Generally, a processor will receive instructions and information/data from a read-only memory or a random access memory or both. The essential elements of a computer are a processor for performing actions in accordance with instructions and one or more memory devices for storing instructions and data. Generally, a computer will also include, or be operatively coupled to receive information/data from or transfer information/data to, or both, one or more mass storage devices for storing data, e.g., magnetic, magneto-optical disks, or optical disks. However, a computer need not have such devices. Devices suitable for storing computer program instructions and information/data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described herein can be implemented on a computer having a display device, e.g., a CRT (cathode ray tube) or LCD (liquid crystal display) monitor, for displaying information/data to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described herein can be implemented in a computing system that includes a back-end component, e.g., as an information/data server, or that includes a middleware component, e.g., an application server, or that includes a front-end component, e.g., a client computer having a graphical user interface or a web browser through which a user can interact with an implementation of the subject matter described herein, or any combination of one or more such back-end, middleware, or front-end components. The components of the system can be interconnected by any form or medium of digital information/data communication, e.g., a communication network. Examples of communication networks include a local area network ("LAN") and a wide area network ("WAN"), an internetwork (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits information/data (e.g., an HTML page) to a client device (e.g., for purposes of displaying information/data to and receiving user input from a user interacting with the client device). Information/data generated at the client device (e.g., a result of the user interaction) can be received from the client device at the server.

While this specification contains many specific implementation details, these should not be construed as limitations on the scope of any disclosures or of what may be claimed, but rather as descriptions of features specific to particular embodiments of particular disclosures. Certain features that are described herein in the context of separate embodiments can also be implemented in combination in a single embodiment. Conversely, various features that are described in the context of a single embodiment can also be implemented in multiple embodiments separately or in any suitable sub combination. Moreover, although features may be described above as acting in certain combinations and even initially claimed as such, one or more features from a claimed combination can in some cases be excised from the combination, and the claimed combination may be directed to a sub combination or variation of a sub combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

CONCLUSION

Many modifications and other embodiments of the disclosures set forth herein will come to mind to one skilled in the art to which these disclosures pertain having the benefit of the teachings presented in the foregoing descriptions and the associated drawings. Therefore, it is to be understood that the disclosures are not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. An apparatus comprising at least one processor and at least one memory including computer program code, the at least one memory and the computer program code configured to, with the at least one processor, cause the apparatus to: receive an input API comprising one or more of subroutine definitions, protocols, or software application building tools; extract API specifications from the input API; and based at least in part on the extracted API specifications and a machine learning model, generate a test suite for the input API, wherein the test suite comprises one or more test routines, one or more data values, and one or more expected results.

2. The apparatus of claim 1, wherein generating the test suite is further based at least in part on one or more of one or more test patterns or one or more heuristics.

3. The apparatus of claim 2, wherein one or more of the one or more test routines, one or more data values, or one or more expected results are selected for inclusion in the test suite based at least in part on an associated applicability.

4. The apparatus of claim 3, wherein the associated applicability is based at least in part on a relationship between the input API and the one or more test patterns or one or more heuristics.

5. The apparatus of claim 2, wherein one or more of the one or more test routines, one or more data values, or one or more expected results are selected for inclusion in the test suite based at least in part on an associated importance level.

6. The apparatus of claim 5, wherein the associated importance level is based at least in part on a relationship between the input API and the one or more test patterns or one or more heuristics.

7. The apparatus of claim 1, wherein the machine learning model is trained based at least in part on one or more of test heuristics, test patterns, or past execution results.

8. A computer-implemented method, comprising: receiving, by one or more processors, an input API comprising one or more of subroutine definitions, protocols, or software application building tools; extracting, by the one or more processors, API specifications from the input API; and based at least in part on the extracted API specifications and a machine learning model, generating, by the one or more processors, a test suite for the input API, wherein the test suite comprises one or more test routines, one or more data values, and one or more expected results.

9. The method of claim 8, wherein generating the test suite is further based at least in part on one or more of one or more test patterns or one or more heuristics.

10. The method of claim 9, wherein one or more of the one or more test routines, one or more data values, or one or more expected results are selected for inclusion in the test suite based at least in part on an associated applicability.

11. The method of claim 10, wherein the associated applicability is based at least in part on a relationship between the input API and the one or more test patterns or one or more heuristics.

12. The method of claim 9, wherein one or more of the one or more test routines, one or more data values, or one or more expected results are selected for inclusion in the test suite based at least in part on an associated importance level.

13. The method of claim 12, wherein the associated importance level is based at least in part on a relationship between the input API and the one or more test patterns or one or more heuristics.

14. The method of claim 8, wherein the machine learning model is trained based at least in part on one or more of test heuristics, test patterns, or past execution results.

15. A computer program product comprising at least one non-transitory computer readable storage medium storing computer code that, when executed by an apparatus, cause the apparatus to: receive an input API comprising one or more of subroutine definitions, protocols, or software application building tools; extract API specifications from the input API; and based at least in part on the extracted API specifications and a machine learning model, generate a test suite for the input API, wherein the test suite comprises one or more test routines, one or more data values, and one or more expected results.

16. The computer program product of claim 15, wherein generating the test suite is further based at least in part on one or more of one or more test patterns or one or more heuristics.

17. The computer program product of claim 16, wherein one or more of the one or more test routines, one or more data values, or one or more expected results are selected for inclusion in the test suite based at least in part on an associated applicability.

18. The computer program product of claim 15, wherein the machine learning model is trained based at least in part on one or more of test heuristics, test patterns, or past execution results.

* * * * *